(12) United States Patent
Park et al.

(10) Patent No.: US 10,215,951 B2
(45) Date of Patent: Feb. 26, 2019

(54) CAMERA MODULE

(71) Applicant: LG INNOTEK CO., LTD., Seoul (KR)

(72) Inventors: Seung Ryong Park, Seoul (KR); Jae Hun Sung, Seoul (KR); Jung Hoo Seo, Seoul (KR); Se Kyu Lee, Seoul (KR); Soo Min Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/743,162

(22) PCT Filed: Jul. 8, 2016

(86) PCT No.: PCT/KR2016/007446
§ 371 (c)(1),
(2) Date: Jan. 9, 2018

(87) PCT Pub. No.: WO2017/007283
PCT Pub. Date: Jan. 12, 2017

(65) Prior Publication Data
US 2018/0210161 A1    Jul. 26, 2018

(30) Foreign Application Priority Data
Jul. 9, 2015  (KR) .......................... 10-2015-0097813

(51) Int. Cl.
*G02B 7/02*    (2006.01)
*H04N 5/225*    (2006.01)
(Continued)

(52) U.S. Cl.
CPC ............. *G02B 7/028* (2013.01); *G03B 17/55* (2013.01); *H01F 38/14* (2013.01);
(Continued)

(58) Field of Classification Search
CPC .... G02B 7/028; H04N 5/2251; H04N 5/2252; H04N 5/22521; H04N 5/2253;
(Continued)

(56) References Cited

U.S. PATENT DOCUMENTS

2006/0171704 A1* 8/2006 Bingle .................... B60R 11/04
396/419
2015/0160536 A1* 6/2015 Lang .................... H04N 5/2251
348/374

(Continued)

FOREIGN PATENT DOCUMENTS

JP    2003-257826 A    9/2003
JP    2009-295240 A    12/2009
(Continued)

*Primary Examiner* — Paul M Berardesca
(74) *Attorney, Agent, or Firm* — Birch, Stewart, Kolasch & Birch, LLP

(57) ABSTRACT

The present invention relates to a camera module, and the present invention comprises: a lens unit; a lens barrel for fixing the lens unit; a substrate unit, which has an image sensor mounted thereon, for converting light incident through the lens unit into an electric signal; and a housing accommodating the substrate unit in an inner space thereof and of which one side is coupled to the lens barrel, and the present invention can comprise: a transmission coil accommodated inside the housing so as to form an electric field, and a conductive heating element arranged on an outer surface of the lens unit or on an outer circumferential surface of the lens barrel, and in which an induced current is generated by the electric field formed by the transmission coil. Since the present invention heats a lens by wirelessly supplying power to a heating element through simple configurations such as a transmission coil and the heating element, large changes are unnecessary in the volume and the structure of a camera module. In addition, since the heating element of the present invention does not restrict (Continued)

incident light, an image of a subject is not distorted and a clean image can be obtained, and thus the present invention is efficient. In addition, the present invention prevents signal interference with other electronic components or electrical components when power is wirelessly supplied to a heating element, and thus, camera malfunction can be prevented.

19 Claims, 3 Drawing Sheets

(51) Int. Cl.
    *H05B 6/36*     (2006.01)
    *H01F 38/14*     (2006.01)
    *G03B 17/55*     (2006.01)
    *B60R 11/04*     (2006.01)
    *B60R 11/00*     (2006.01)

(52) U.S. Cl.
    CPC ......... *H04N 5/2253* (2013.01); *H04N 5/2254* (2013.01); *H04N 5/2257* (2013.01); *H04N 5/22521* (2018.08); *H05B 6/36* (2013.01); *B60R 11/04* (2013.01); *B60R 2011/004* (2013.01)

(58) Field of Classification Search
    CPC ............... H04N 5/2254; H04N 5/2257; H05B 6/02–6/44; H01F 2038/143; H01F 2038/146; H01F 38/14; G03B 17/55
    See application file for complete search history.

(56) References Cited

U.S. PATENT DOCUMENTS

| | | | |
|---|---|---|---|
| 2017/0099700 A1* | 4/2017 | Chae | H04N 5/2252 |
| 2018/0013933 A1* | 1/2018 | Barton | B08B 6/00 |
| 2018/0239105 A1* | 8/2018 | Lee | G02B 27/00 |

FOREIGN PATENT DOCUMENTS

| | | |
|---|---|---|
| JP | 2015-14581 A | 1/2015 |
| KR | 10-1469990 B1 | 12/2014 |

* cited by examiner

[FIG 1]
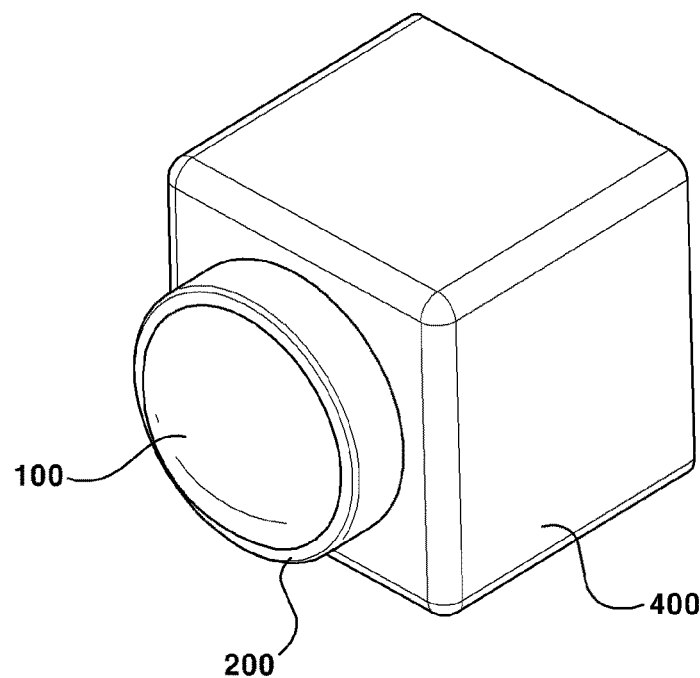
[FIG 2]
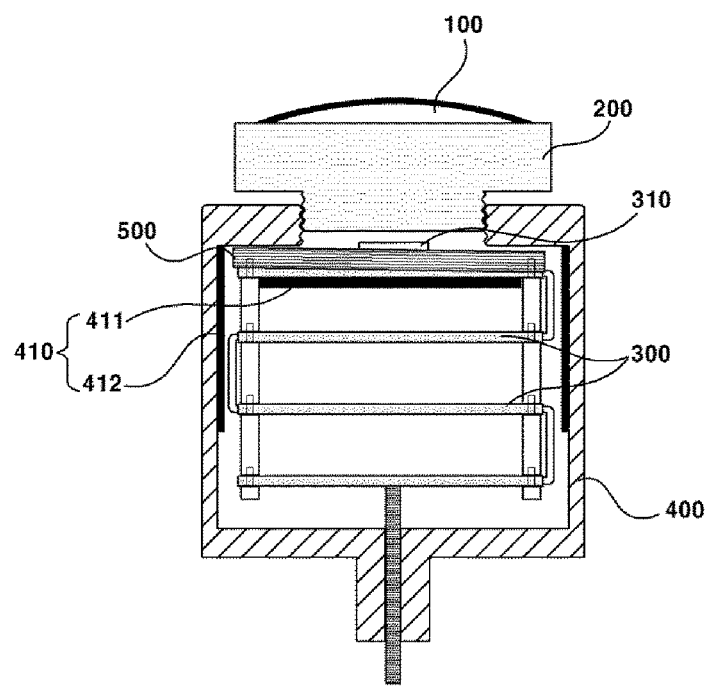

[FIG 3]
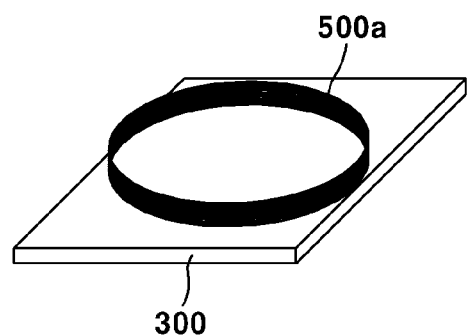
[FIG 4]
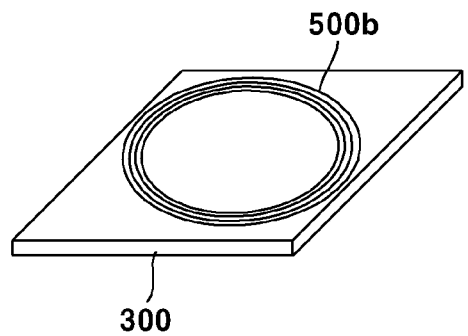
[FIG 5]
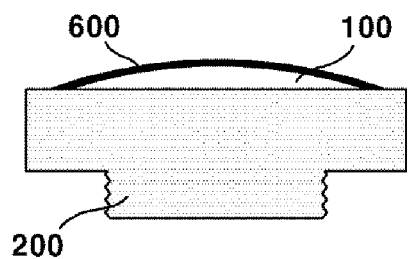

[FIG 6]
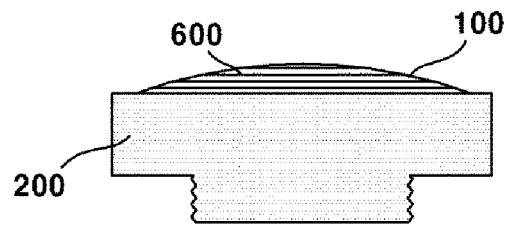
[FIG 7]
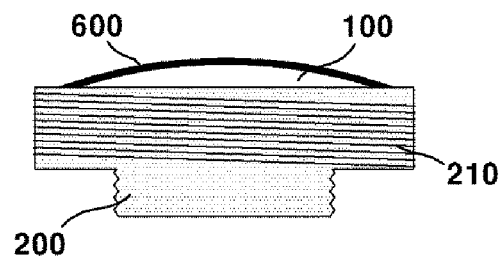
[FIG 8]
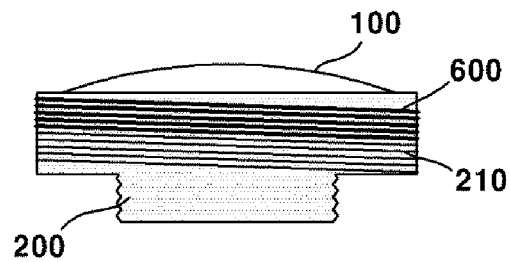

CAMERA MODULE

CROSS REFERENCE TO RELATED APPLICATIONS

This application is the National Phase of PCT International Application No. PCT/KR2016/007446, filed on Jul. 8, 2016, which claims priority under 35 U.S.C. 119(a) to Patent Application No. 10-2015-0097813, filed in the Republic of Korea on Jul. 9, 2015, all of which are hereby expressly incorporated by reference into the present application.

TECHNICAL FIELD

The teachings in accordance with exemplary and non-limiting embodiments of this invention relate generally to a camera module, and more particularly to a camera module for vehicular camera module.

BACKGROUND ART

Concomitant with increased demand on convenience and safety for drivers in the automobile industries, new technologies are being variously grafted and particularly, the technologies using cameras are being fused with software technologies to be briskly applied. These cameras are mounted outside of a vehicle to therefore require a clean image even under various climate conditions. Toward this end, the basically requirement is to heat a lens in order to prevent moisture or frost formed on a lens. In order to heat a lens, a heater must be basically installed and this heater must be installed on a lens surface or installed near to a lens to apply a heat to the lens.

However, in order to apply a power to a heater, an electric wire is connected and in order to make the heater including the electric wire water-proof, a complex structure may be required to disadvantageously need a structure larger in size than that of the conventional camera.

DETAILED DESCRIPTION OF THE INVENTION

Technical Subject

In order to solve the abovementioned problems/disadvantages, exemplary embodiments of the present invention are to provide a camera module configured to heat a lens by wirelessly supplying a power to a heating element.

Another object of the present invention is to provide a camera module configured to prevent restriction of an incident light by way of the heating element of a lens, whereby a camera module free from distorted subjects can be provided.

Still another object of the present invention is to provide a camera module configured to prevent signal interference with other electronic components or electrical components when power is wirelessly supplied to a heating element.

Technical Solution

In one general aspect of the present invention, there is provided a camera module, the camera module comprising:
a lens unit;
a lens barrel for fixing the lens unit;
a housing accommodated at one side of the lens barrel;
a substrate unit accommodated inside the housing;
an image sensor mounted on the substrate unit;
a transmission coil accommodated inside the housing to be electrically connected to the substrate unit; and
a heating element arranged at the lens unit to generate a heat in response to an electromagnetic interaction with the transmission coil.

Preferably, but not necessarily, the transmission coil may be arranged on the substrate unit in a spiral shape about an optical axis.

Preferably, but not necessarily, the transmission coil may be printed on the substrate unit in a spiral shape.

Preferably, but not necessarily, the lens barrel may be formed at an outer circumferential surface with a reception coil electrically connected to the heating element, wherein a current flows on the reception coil by an electric field generated the transmission coil.

Preferably, but not necessarily, the lens barrel may include a metal, wherein the metal may generate a heat by electromagnetic interaction with the transmission coil.

Preferably, but not necessarily, the lens barrel may be wound at an outer circumferential surface with the reception coil in order to receive a power from the transmission coil wirelessly.

Preferably, but not necessarily, resistance of the heating element may be 10-100Ω.

Preferably, but not necessarily, the heating element may be formed with a transparent material in order to prevent an incident light from being distorted when passing through the lens unit.

Preferably, but not necessarily, the heating element may be one of ITO (Indium Tin Oxide), graphine and nano wire.

Preferably, but not necessarily, the camera module may further comprise a shield unit accommodated inside of the housing to shield a wireless power signal of the transmission coil.

Preferably, but not necessarily, the shield unit may further include a first shield unit accommodated at a bottom side of the transmission coil to shield the wireless power signal from the transmission coil.

Preferably, but not necessarily, the shield unit may further include, on at least a portion of inner lateral surface of the housing, a second shield unit to shield the wireless power signal from the transmission coil.

Preferably, but not necessarily, the shield unit may include a ferrite.

Preferably, but not necessarily, the camera module may further comprise an insulation film formed at an outside of the heating element or an outside of the reception coil to prevent a current from being leaked to an outside.

Preferably, but not necessarily, the insulation film outside of the heating element may be coated by an AR (Anti-Reflection) matter.

Advantageous Effects

Since the present invention heats a lens by wirelessly supplying power to a heating element through simple configurations such as a transmission coil and the heating element, large changes are unnecessary in the volume and the structure of a camera module.

In addition, since the heating element of the present invention does not restrict incident light, an image of a subject is not distorted and a clean image can be obtained, and thus the present invention is efficient.

In addition, the present invention prevents signal interference with other electronic components or electrical components when power is wirelessly supplied to a heating element, and thus, camera malfunction can be prevented.

BRIEF DESCRIPTION OF DRAWINGS

FIG. 1 is perspective view illustrating a camera module according to an exemplary embodiment of the present invention.

FIG. 2 is a schematic cross-sectional view illustrating a camera module according to an exemplary embodiment of the present invention.

FIG. 3 is a schematic view illustrating a transmission coil of camera module being accommodated on a substrate unit according to an exemplary embodiment of the present invention.

FIG. 4 is schematic view illustrating a transmission coil of camera module being printed on a substrate unit according to an exemplary embodiment of the present invention.

FIG. 5 is schematic view illustrating a heating element of camera module being accommodated on a lens unit according to an exemplary embodiment of the present invention.

FIG. 6 is schematic view illustrating a heating element being patterned on a lens unit of camera module according to an exemplary embodiment of the present invention.

FIG. 7 is schematic view illustrating a reception coil being arranged on a lens barrel of camera module according to an exemplary embodiment of the present invention.

FIG. 8 is schematic view illustrating a reception coil and a heating element being arranged on a lens barrel of camera module according to an exemplary embodiment of the present invention.

BEST MODE

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

Furthermore, although the following first to fifth exemplary embodiments have been described as an independent exemplary embodiment to implement the present invention, it should be interpreted that these first to fifth exemplary embodiments may be applied by being mutually combined of two or more exemplary embodiments.

First Exemplary Embodiment

Hereinafter, a camera module according to a first exemplary embodiment of the present invention will be described with reference to accompanying drawings.

FIG. 1 is perspective view illustrating a camera module according to an exemplary embodiment of the present invention, and FIG. 2 is a schematic cross-sectional view illustrating a camera module according to an exemplary embodiment of the present invention.

Referring to FIGS. 1 and 2, the camera module according to an exemplary embodiment of the present invention may include a lens unit (100), a lens barrel (200), a substrate unit (300), a housing (400), a transmission coil (500) and a heating element (600).

The lens unit (100) may be such that at least one lens (no reference numeral) is arranged along an optical axis and may be accommodated inside the lens barrel (200). The lens barrel (200) may fix the lens unit (100) by accommodating the lens unit (100) inside the lens barrel, lest optical axes formed by the lenses be mismatched to thereby protect the lens unit (100).

The substrate unit (200) may be mounted with an image sensor (310) whose optical axis is matched to that of the lens unit (100) in order to convert a light incident through the lens unit (100) to an electric signal. As illustrated in FIG. 2, the substrate unit (200) may be provided with a plurality of substrates (no reference numeral), and the substrates may be electrically connected by a separate connection member.

The housing (400) may be coupled by at least one portion of the lens barrel (200) by being accommodated to one side of the housing (200), and may accommodate the substrate unit (300) at an inner space. Furthermore, the housing (400) may be formed at the other side with a connector (no reference numeral) by being connected to the substrate unit (300) of inner space of the housing (400) to supply a power of outside. Furthermore, the housing (400) may be accommodated at an inner space with the transmission coil (described later). The housing (400) will be described again later in more detail.

FIG. 3 is a schematic view illustrating a transmission coil (300a) of camera module being accommodated on a substrate unit according to an exemplary embodiment of the present invention.

Referring to FIG. 3, the transmission coil (500a) may be arranged at an upper surface of the substrate unit (300) to be electrically connected to a circuit of the substrate unit (300). The transmission coil (500a) may be arranged in a spiral shape like wrapping an outer circumferential surface of an imaginary cylinder, and when a current is flown by a power of outside being supplied to the substrate unit (300), an electric field may be formed upwardly. At this time, the transmission coil (500a) may be fixed to the substrate unit (300) using bonding, soldering or a separate device, and when the transmission coil (500a) and the substrate unit (300) are fixed to be electrically connected by a user's intention, fixing means may be variably selected.

FIG. 4 is schematic view illustrating a transmission coil (500b) of camera module being printed on a substrate unit according to an exemplary embodiment of the present invention.

Referring to FIG. 4, the transmission coil (500b) may be such that a coil is printed at an upper surface of the substrate unit (300) about an optical axis to allow a current to flow through a circuit. The transmission coil (500b) may be printed at an upper surface of the substrate unit (300) in a spiral shape to form an electrical field when a current flows.

Albeit not being illustrated in FIGS. 3 and 4, the transmission coil (500a, 500b) may be formed at an inner side with an image sensor (310), and the transmission coil (500a, 500b) may not be physically interfered with the image sensor (310).

FIG. 5 is schematic view illustrating a heating element (600) of camera module being accommodated on a lens unit (100) according to an exemplary embodiment of the present invention.

Referring to FIG. 5, the heating element (600) may be arranged at an outer surface of the lens unit (100). The heating element (600) may be formed with an electric conductive material. The heating element (600) may be electrically interacted with the transmission coil (500a, 500b). For example, when an electrical field is formed by allowing a current to flow in the transmission coil (500a, 500b), an electric charge inside the heating element (600) is vibrated by the electrical field to thereby generate a heat. A resistance of the heating element (600) may be preferably 100-100Ω. At this time, when the resistance is lower than 10Ω, an overcurrent may flow, and when the resistance is higher than 100Ω, a resistance becomes higher to make it difficult for a current to flow.

Furthermore, it may be preferable that the heating element (600) be formed with a transparent material to allow an incident light to be prevented from being restricted when the incident light passes the lens unit (100). As a result, the camera module according to the present invention can obtain a further clear image of an object.

The heating element (600) may be formed with any one of ITO (Indium Tin Oxide), graphine and nano wire. Although the heating element (600) is not transparent, the heating element (600) may use a nano wire that hardly restricts incidence of light. In addition, when the heating element can generate a heat through a wireless power using a transparent material, the present invention is not limited thereto.

Although not illustrated in the drawings, the heating element (600) may be further formed at an outside with an insulation film that can prevent a current from being leaked to outside. The insulation film may comprise an AR (Anti-Reflection) matter. Thus, the insulation film can prevent a current from being leaked to outside and can obtain a clear image by reducing a reflexibility of the lens.

Referring to FIG. 2, the housing (400) may be preferably formed with a non-conductive material in order to prevent the electromagnetic wave generated from the transmission coil (500) from being leaked to outside. Most preferably, the housing (400) may be formed with a plastic material. If the housing (400) is formed with a conductive material, the housing (400) may generate a heat by allowing an inductive current to flow by an electrical field generated from the transmission coil (500), but because the housing (400) is relatively farther distanced from the lens barrel (200) than the lens barrel (200), and size is relatively greater than the lens barrel (200) area-wise, the heat generated from the housing (400) is greater than the heat emitted to outside over the heat transmitted to the lens unit (100), and the power consumption versus lens heating is low to be ineffective.

The housing (400) may further include therein a shield unit (410). The shield unit (4100 may block a wireless power signal, i.e., an electrical field, of the transmission coil (500).

The shield unit (410) may include first and second shield units (411, 412). Interference of the wireless power signal with components mounted on the substrate unit (300) can be prevented by the shield unit (410) in the first exemplary embodiment of the present invention.

The first shield unit (410) may be mounted on the substrate unit (300). In other words, the first shield unit (411) may be installed at bottom side of the transmission coil (500), and may be installed on a substrate mounted with an image sensor (310) in a plurality of substrates. That is, the first shield unit may be preferably installed at a bottom surface of a substrate disposed at an uppermost surface of the plurality of substrates to shield the electrical field affecting elements of other substrates.

The second shield unit (412) may be arranged on at least a portion of an inner lateral surface of the housing (400) to prevent the wireless power signal of the transmission coil (500) from being emitted to outside. The first and second shield units (411, 312) may include a ferrite. The first and second shield units (411, 312) illustrated in drawings are exemplary, shapes and scopes thereof may not be limited, and the shape of the first and second shield units (411, 312) being included by the ferrite is not limited either. For example, the ferrite may be included when the first and second shield units (411, 312) are manufactured, and may be coated on surfaces of the first and second shield units (411, 312). The shield unit (410) may be variably provided depending on user's selection.

Second Exemplary Embodiment

Hereinafter, a camera module according to a second exemplary embodiment of the present invention will be described with reference to accompanying drawings. In describing the camera module according to the second exemplary embodiment of the present invention, same reference numerals as those in the first exemplary embodiment will be used for same elements and any redundant explanation will be omitted.

The camera module according to the second exemplary embodiment of the present invention is different from the first exemplary embodiment in that the lens barrel (200) in the camera module according to the second exemplary embodiment of the present invention is formed with a metal. When the lens barrel (200) in the camera module according to the second exemplary embodiment of the present invention is formed with a metal, an electromagnetic interaction with the transmission coil (500) can be made possible. For example, an induction current can be generated on the lens barrel (200) by an electric field generated from the transmission coil (500), a heat can be generated as in the heating element (600). In the second exemplary embodiment, the lens unit (100) is heated twice to further increase the heating efficiency of the lens.

Third Exemplary Embodiment

Hereinafter, a camera module according to a third exemplary embodiment of the present invention will be described with reference to accompanying drawings. In describing the camera module according to the third exemplary embodiment of the present invention, same reference numerals as those in the first exemplary embodiment will be used for same elements and any redundant explanation will be omitted.

FIG. 6 is schematic view illustrating a heating element (600) being formed with a pattern on a lens unit of camera module according to an exemplary embodiment of the present invention, the structure of which makes the third exemplary embodiment different from the first and second exemplary embodiments.

Referring to FIG. 6, the camera module according to the third exemplary embodiment of the present invention may be different from that of the first exemplary in that although the heating element (600) is arranged at an upper surface of the lens unit (100), a predetermined pattern is formed on the upper surface of the lens unit (100). The pattern of the heating element (600) may be formed about an optical axis in a spiral shape. However, the present invention is not limited thereto, and any structure allowing an induction current to flow on the pattern may be used. For example, the heating element (600) may be also formed in a zigzag shape at an upper surface of lens unit (100).

Fourth Exemplary Embodiment

Hereinafter, a camera module according to a fourth exemplary embodiment of the present invention will be described with reference to accompanying drawings. In describing the camera module according to the fourth exemplary embodiment of the present invention, same reference numerals as those in the first exemplary embodiment will be used for same elements and any redundant explanation will be omitted.

FIG. 7 is schematic view illustrating a reception coil being arranged on a lens barrel of camera module according to an exemplary embodiment of the present invention, the structure of which makes the fourth exemplary embodiment different from the first to third exemplary embodiments.

Referring to FIG. 7, a reception coil (210) may be wound in a spiral shape on an outer circumferential surface of the lens barrel (200). The reception coil (210) may perform an electromagnetic interaction with the transmission coil (500a, 500b). For example, an induction current may flow in the reception coil (210) by a wireless power signal, i.e., by an electric field of the transmission coil (500), to also allow the reception coil (210) to generate a heat.

The reception coil (210) may perform an electromagnetic interaction with the heating element (600). For example, an induction current flowing in the reception coil (210) may flow in the same direction as that of the transmission coil (500) to allow an electric charge inside the heating element (600) to vibrate, whereby the heating element (600) can generate a heat. Thus, both the reception coil (210) and the heating element (600) can generate a heat to make it easier to heat the lens.

Meantime, the reception coil (210) and the heating element (600) may be electrically connected to allow the heating element (600) to generate a heat. At this time, the lens barrel (200) may be formed with a metal to make heat transmission easier, whereby efficiency of heating the lens can be further increased.

Fifth Exemplary Embodiment

Hereinafter, a camera module according to a fifth exemplary embodiment of the present invention will be described with reference to accompanying drawings. In describing the camera module according to the fifth exemplary embodiment of the present invention, same reference numerals as those in the first exemplary embodiment will be used for same elements and any redundant explanation will be omitted.

FIG. 8 is schematic view illustrating a reception coil (210) and a heating element (600) being arranged on a lens barrel (200) of camera module according to an exemplary embodiment of the present invention, the structure of which makes the fifth exemplary embodiment different from the first to fourth exemplary embodiments.

Referring to FIG. 8, the heating element (600) may be formed in a wound shape on an outer circumferential surface of the lens barrel (200), and the reception coil (210) may be also wound on the outer circumferential surface of the lens barrel (200).

The reception coil (210) may be flown with an induction current in the same direction as that of the transmission coil (500) by an electric field generated by the transmission coil (500) to allow the reception coil (210) to be generated with the electric field, whereby an electric charge inside the heating element (600) can vibrate, and the reception coil (210) can also generate a heat thereinside.

Furthermore, the reception coil (210) and the heating element (600) may be electrically connected to allow the heating element (600) to generate a heat. At this time, the lens barrel (200) may be formed with a metal to make heat transmission easier, whereby efficiency of heating the lens can be further increased.

Although the aforesaid explanations are simply exemplary embodiments to describe the camera module according to the present invention, the present invention is not limited thereto, and thereof, it should be understood that numerous other modifications and embodiments can be devised by those skilled in the art that will fall within the spirit and scope of the principles of this disclosure.

The invention claimed is:

1. A camera module, the camera module comprising:
   a lens unit;
   a lens barrel for fixing the lens unit;
   a housing accommodated at one side of the lens barrel;
   a substrate unit accommodated inside the housing;
   an image sensor mounted on the substrate unit;
   a transmission coil accommodated inside the housing to be electrically connected to the substrate unit; and
   a heating element arranged at the lens unit to generate a heat in response to an electromagnetic interaction with the transmission coil.

2. The camera module of claim 1, wherein the transmission coil is arranged on the substrate unit in a spiral shape about an optical axis.

3. The camera module of claim 1, wherein the transmission coil is printed on the substrate unit in a spiral shape.

4. The camera module of claim 1, wherein the lens barrel includes a metal, wherein the metal generates a heat by electromagnetic interaction with the transmission coil.

5. The camera module of claim 1, wherein the heating element is arranged on the lens unit in a spiral shape.

6. The camera module of claim 1, further comprising a reception coil accommodated on the lens barrel to generate a heat in response to an electromagnetic interaction with the transmission coil, and to heat the heating element by being electrically connected to the heating element, or electromagnetically interacting with the heating element.

7. The camera module of claim 1, wherein a reception coil is arranged in a spiral shape along an outer circumferential surface of the lens barrel.

8. The camera module of claim 1, comprising:
   a lens unit;
   a lens barrel for fixing the lens unit;
   a housing accommodated at bottom side of the lens barrel;
   a substrate unit accommodated inside the housing;
   an image sensor mounted on the substrate unit;
   a transmission coil accommodated inside the housing to be electrically connected to the substrate unit;

a reception coil accommodated on the lens barrel to generate a heat in response to an electromagnetic interaction with the transmission coil; and a heating element arranged at the lens unit to generate a heat in response to an electromagnetic interaction with the transmission coil, and to generate a heat by electromagnetically interacting with the reception coil, or being electrically connected to the reception coil.

9. The camera module of claim 8, wherein the reception coil and the heating element are arranged in a spiral shape at an outer circumferential surface of the lens barrel.

10. The camera module of claim 1, wherein resistance of the heating element is 10-100Ω.

11. The camera module of claim 1, further comprising a shield unit accommodated inside of the housing to shield an electromagnetic signal.

12. The camera module of claim 11, wherein the shield unit is accommodated at a bottom side of the transmission coil to shield the electromagnetic signal of the transmission coil.

13. The camera module of claim 12, wherein the shield unit is accommodated on at least a portion of an inner lateral surface of the housing to shield the electromagnetic signal of the transmission coil.

14. The camera module of claim 1, further comprising an insulation film coated on the heating element or the reception coil.

15. The camera module of claim 14, wherein the insulation film comprises an AR (Anti-Reflection) matter.

16. A vehicular camera, the vehicular camera mounted at a front side, a rear side or a lateral surface of a vehicle, the vehicular camera comprising:

a lens unit;

a lens barrel for fixing the lens unit;

a housing accommodated at bottom side of the lens barrel;

a substrate unit accommodated inside the housing;

an image sensor mounted on the substrate unit;

a transmission coil accommodated inside the housing to be electrically connected to the substrate unit; and a heating element arranged at the lens unit to generate a heat in response to an electromagnetic interaction with the transmission coil.

17. The camera module of claim 8, wherein resistance of the heating element is 10-100Ω.

18. The camera module of claim 8, further comprising a shield unit accommodated inside of the housing to shield an electromagnetic signal.

19. The camera module of claim 8, further comprising an insulation film coated on the heating element or the reception coil.

* * * * *